(12) United States Patent
Guo

(10) Patent No.: US 7,603,452 B1
(45) Date of Patent: Oct. 13, 2009

(54) NETWORKED COMPUTER ENVIRONMENT ASSURANCE SYSTEM AND METHOD

(75) Inventor: Yi C Guo, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1161 days.

(21) Appl. No.: 10/393,568

(22) Filed: Mar. 21, 2003

Related U.S. Application Data

(60) Provisional application No. 60/367,877, filed on Mar. 26, 2002.

(51) Int. Cl.
*G06F 15/173* (2006.01)

(52) U.S. Cl. ............ 709/223; 709/225; 709/224; 709/202; 709/203

(58) Field of Classification Search .......... None
See application file for complete search history.

(56) References Cited

U.S. PATENT DOCUMENTS

| | | | |
|---|---|---|---|
| 4,432,057 A | 2/1984 | Daniell et al. ............ 364/300 |
| 5,153,919 A | 10/1992 | Reeds, III et al. ............ 380/44 |
| 5,732,275 A | 3/1998 | Kullick et al. ............ 395/712 |
| 5,758,068 A | 5/1998 | Brandt et al. ............ 395/186 |
| 5,815,652 A | 9/1998 | Ote et al. ............ 395/183.07 |
| 5,919,247 A | 7/1999 | Van Hoff et al. ............ 709/217 |
| 6,018,805 A * | 1/2000 | Ma et al. ............ 714/4 |
| 6,052,787 A | 4/2000 | Euchner et al. ............ 713/201 |
| 6,061,693 A | 5/2000 | Carney et al. ............ 707/200 |
| 6,131,120 A | 10/2000 | Reid ............ 709/225 |
| 6,158,010 A | 12/2000 | Moriconi et al. ............ 713/201 |
| 6,249,575 B1 | 6/2001 | Heilmann et al. ............ 379/189 |
| 6,349,338 B1 | 2/2002 | Seamons et al. ............ 709/229 |

(Continued)

FOREIGN PATENT DOCUMENTS

WO    WO 02/099682    12/2002

OTHER PUBLICATIONS

Gary Holland, "*Subscriber Authentication for Ethernet-based Metro/Broadband Networks*", Jun. 2002, 9 pages. [online]. Retrieved on Aug. 29, 2006. Retrieved from the Internet:<URL:http://www.riverstonenet.com/pdf/802.1x.pdf>.

(Continued)

*Primary Examiner*—John Follansbee
*Assistant Examiner*—Dhairya A Patel
(74) *Attorney, Agent, or Firm*—Gunnison, McKay & Hodgson, L.L.P.; Serge J. Hodgson

(57) ABSTRACT

A system and method for configuration management and enforcement of software applications in a computer network. The system comprises of one or more server computers, a configuration rules database and a plurality of client computers. Each client computer has an agent running on it. The agent, after being invoked or on a periodic basis, contacts a server computer to obtain the latest configuration rules from the configuration rules database. The configuration rules are then used by the agent to check the validity of the software applications. The agent also sends log data, back to the server computer, containing details of the status of the computer, any violations, actions taken, time of violations, etc. The present invention also provides a method to check and ensure that the agent is required to be run on all the client computers in order for these computers to communicate with other computers in the network.

15 Claims, 3 Drawing Sheets

U.S. PATENT DOCUMENTS

| | | | |
|---|---|---|---|
| 6,751,659 B1 * | 6/2004 | Fenger et al. | 709/223 |
| 6,820,069 B1 * | 11/2004 | Kogan et al. | 706/46 |
| 6,892,241 B2 * | 5/2005 | Kouznetsov et al. | 709/229 |
| 6,944,765 B1 | 9/2005 | Rose et al. | 713/181 |
| 6,976,068 B2 * | 12/2005 | Kadam et al. | 709/223 |
| 7,020,645 B2 | 3/2006 | Bisbee et al. | 707/1 |
| 7,024,690 B1 | 4/2006 | Young et al. | 726/5 |
| 7,123,721 B2 | 10/2006 | Panjwani et al. | 380/270 |
| 7,228,291 B2 | 6/2007 | Seamons et al. | 705/37 |
| 2002/0023145 A1 * | 2/2002 | Orr et al. | 709/219 |
| 2002/0199115 A1 * | 12/2002 | Peterson et al. | 713/201 |
| 2003/0126464 A1 | 7/2003 | McDaniel et al. | 713/201 |
| 2006/0053283 A1 | 3/2006 | Feinleib et al. | 713/165 |

OTHER PUBLICATIONS

John Wobus, "*DHCP FAQ*", Oct. 26, 1998, 22 pages. [online]. Retrieved on Aug. 29, 2006. Retrieved from the Internet: <URL:http://www.dhcp-handbook.com./dhcp_faq.html>.

Yi C. Guo et al., U.S. Appl. No. 10/366,242, filed Feb. 13, 2003, entitled "System and Method for Enforcing Access Control in an Enterprise Corporate Network".

* cited by examiner

NETWORKED COMPUTER ENVIRONMENT ASSURANCE SYSTEM AND METHOD

CROSS REFERENCE TO RELATED APPLICATIONS

This application claims the benefit of the earlier filing date of U.S. Provisional Application No. 60/367,877, entitled "Networked Computer Environment Assurance System and Method", filed on Mar. 26, 2002.

BACKGROUND

The present invention relates to software applications/programs running on client computers in a computer network. More specifically, it relates to a system and method for 'configuration management and enforcement' of such software application/programs.

Nowadays, Enterprise Corporate Networks have become the backbone of business organizations. An Enterprise Corporate Network is a computer network that enables the users in the organization to communicate, exchange information and share network resources within the organization and also with other organizations. A typical enterprise network, in general, is based on client-server architecture, where one or more server computers serve requests from a large number of client computers. The client computers run a set of software applications that enable a client computer to communicate with a server (such as FTP, WWW, e-mail), as well as to run standalone programs (such as word processing programs, anti-virus program, multimedia player programs etc.). Nowadays client computers have the ability to simultaneously run multiple sophisticated software applications at a given point of time. These software applications can either run in foreground (for example word processing, e-mail program etc.), or can run in background (such as anti-virus programs, scheduling agent program).

During the past few decades, Enterprise Corporate Networks have grown tremendously in terms of complexity, size and number of users. Current enterprise networks can seamlessly interconnect thousands of computing devices within the organization. The software applications have also experienced a similar growth. Within short intervals of time, many new software applications are being introduced in the market with a new set of features and advancements over their previous versions. The Internet has also significantly accelerated the release schedule of such software applications. New releases, updates and bug-fixtures of software applications are available on the websites of software vendors, which can be downloaded and installed by the users.

The significant growth of enterprise networks and software applications has also presented some problems and issues for the system administrators of the enterprise network. One of the major issues is to ensure that such software applications run in the correct manner. Consider the example of an anti-virus program installed on a client machine in an enterprise network. Here correct operation means that the anti-virus program always runs on the client machine, and the program has the latest virus definition files in order to provide protection from the latest viruses. However, if the user disables the anti-virus program, or if the anti-virus program is not updated with latest virus-definition files, the desired benefits from the anti-virus program may not be available. This may result in considerable loss to an organization in case of a virus attack. Thus, it becomes imperative for an organization to ensure correct operation of software applications on all the computers.

Another major issue is to maintain consistency and uniformity in the network in terms of various configurations and settings of software applications running on computers in the network. For example, inconsistencies in software versions and settings may result in inadvertent formatting errors in shared documents and files. This can lead to reduced efficiency, and loss of time and money for the organization as a whole.

Various approaches exist in the art to address the above issues. In some organizations, it is the responsibility of a system administrator to keep all software applications updated, and to ensure that they work with the correct settings. In such organizations, the system administrator visits each client computer and updates each computer with new settings/patches of all software applications that need an update. This approach, however, becomes laborious and time consuming when there are a large number of computers in a network. It is difficult for a system administrator to frequently and regularly update all the computers. Further, it is an arduous task to monitor whether all the software applications are running correctly.

There also exist patents that try to address above-mentioned issues, and some of them are discussed below.

U.S. Pat. No. 5,732,275, entitled "Method And Apparatus For Managing And Automatically Updating Software Programs", assigned to Apple Computer, Inc., Cupertino, Calif., USA, is aimed at automatically managing, monitoring and updating a software application with a newer version in a completely automated fashion. The patent discloses use of a control module that locates and identifies other versions of an application. The control module then selects a software version on the basis of specified criteria and runs the selected version of the software application. The invention disclosed in the patent allows multiple versions of an application to remain accessible on the computer. The control module manages the launching of a particular version that may be required. Statistical data relating to the launching and operation of the application is collected, and uploaded to a central location on a regular basis.

U.S. Pat. No. 5,919,247, entitled "Method For The Distribution Of Code And Data Updates" assigned to Marimba, Inc., USA, is aimed at large scale distribution of application code and data. The invention disclosed in the patent allows for automatic updating, personalization, and usage monitoring of applications. According to the disclosed invention, an end-user subscribes to a server to update software applications running on his/her machine. The server then delivers the requested applications to the user. At a later point of time, the user may again send a subscription request and the server will then send the updated applications. Once downloaded, the applications can be run on the host computer as many times as required without needing to contact the server.

WIPO Publication Number 02/099682, titled "Remote Management Agent For Application Provisioning And Content Synchronization In An Unattended Operation Environment", assigned to Sequoia Broadband, Inc., CA, USA, is aimed at enabling a remote computer to recover from abnormal operating conditions in a computer without human intervention. The disclosed system provides a remote management agent which runs in a remote computer. Further, a network operations center is operatively in communication with a data network. The system enables monitoring a predetermined set of environmental values at a remote computer. These values are reported back to the network operations center in case a value exceeds a predetermined value. Further, with the help of the remote management agent, the system allows for software provisioning and content synchronization. Software provisioning pertains to providing updates to already running software or providing for new software according to a predetermined criterion. Content synchronization pertains to maintaining and updating a file storage structure on a database. The system also provides for automatic upgrading when a software version is not up-to-date.

However, all of the mentioned patents and publications suffer from one or more of the following shortcomings. Firstly, downloading newer software versions is solely based on the prerogative of the user. It may still happen that a user may choose not to run these software applications and thereby hinder the normal operation of software upgrading. This may lead to the earlier mentioned problems of inconsistency or incompatibility between different software applications running on the network. Secondly, there is no mechanism to prevent a user from running an incorrect version of a software application. Thirdly, there is no mechanism to identify whether the monitoring and updating agents are running in a correct manner on all the nodes in a network.

In light of the above discussion, it is evident that there exists need for a system and a method that effectively monitors and ensures correct operation of software applications in a network. A need also exists for a system that automatically updates and monitors the software application, without depending on the end-users.

SUMMARY

An object of the current invention is to provide a system and method that effectively monitors and ensures correct operation of software applications in a computer network.

Another object of the invention is to provide a system and method that enforces an operation environment on computers in a computer network.

Still another object of the invention is to provide a system and method that blocks the software applications that do not conform to enforced settings.

In order to attain the above-mentioned objectives, the current invention provides a system and method for configuration management and monitoring of applications. The system comprises one or more server computers, a configuration rules database and a plurality of client computers. Each client computer has an agent running on it. The agent, after being invoked, or on a periodic basis, contacts a server computer to obtain the latest configuration rules from the configuration rules database. The configuration rules are then used by the agent to check the correct operation of software application. The agent also sends log data, back to the server computer, containing details of the status of the computer, any violations, actions taken, time of violations, etc. The present invention also provides a method to check and ensure that the agent is required to be run on all the client computers.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention discloses a system and method for 'Configuration Management and Enforcement' of software applications running on computers in a computer network. The computer network may be a Local Area Network (LAN), a Metropolitan Area Network (MAN), a Wide Area Network (WAN), a Virtual Private Network (VPN) or the like. The present invention permits the enforcement of an operation environment on computers within the computer network. Enforcing an operation environment includes ensuring that software applications running on the computers in the network run in a correct manner.

Figure 1:
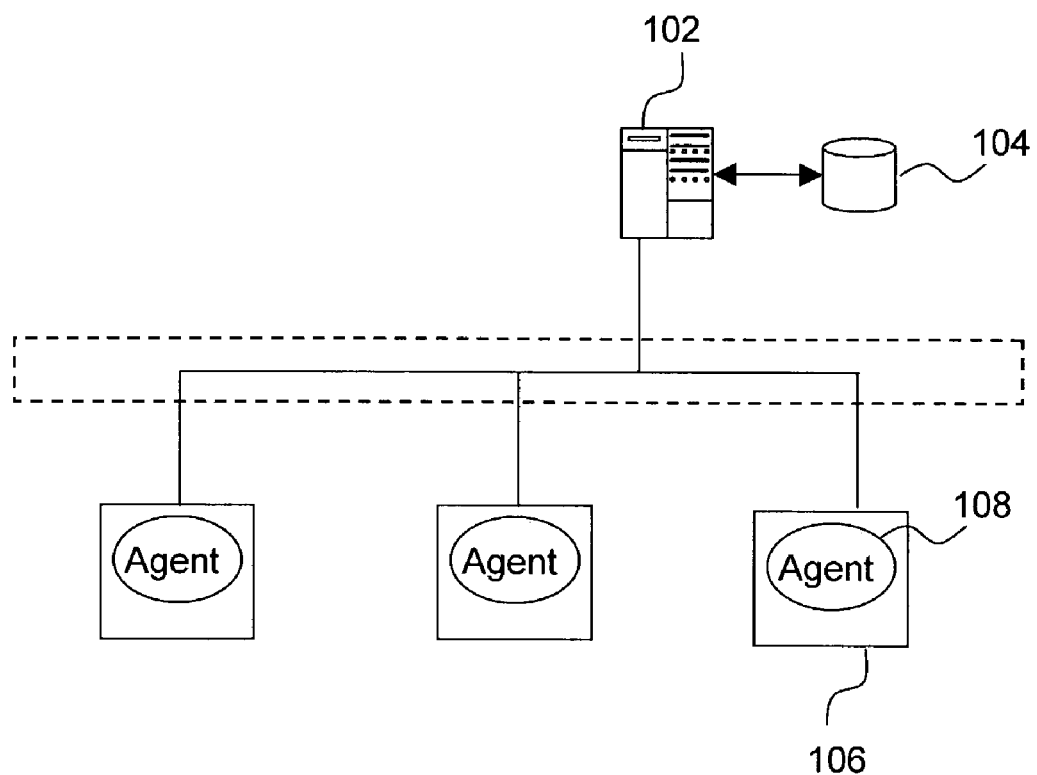
FIG. 1 is a block diagram of the system of the present invention.

FIG. 1 is a block diagram of a computer network, in accordance with a preferred embodiment of the present invention. The computer network is based on client-server architecture. The computer network comprises one or more server computers 102, a configuration rules database 104 and a plurality of client computers 106. Client computers 106 can be any computing device, such as a Personal Computer (PC), laptop, Tablet PC, cell phone, pager, wireless email device, Personal Digital Assistant (PDA), networked printer etc. Each client computer 106 has an agent 108 running on it. Agent 108 is a software application running on client computer 106. Agent 108 can be a TCP/IP application or communication application using other protocols, such as raw Ethernet packet. Agent 108 can be created using any high level programming language like C, C++, JAVA, C# etc. Additional details regarding development of TCP/IP applications on Windows platform can be found on the Microsoft® Developer Network (MSDN) website http://msdn.microsoft.com.

Server computer 102 is a computing device that stores and maintains configuration rules relating to the operation environment of software applications running on the client computers. Server computer 102 is connected to a configuration rules database 104 in order to store configuration rules data. Standard database management systems (DBMS) such as IBM® DB2/Common-Server, Sybase®, Oracle® and the like can be used for storing the configuration rules. Server computer 102 can be implemented using an IBM® Netfinity® server comprising a RISC-based processor, AIX®, an operating system and a web server program, such as Netscape Enterprise Server. Server computer 102 may also include a display supporting a graphical user interface (GUI) for management and administration of the network. Server computer 102 may additionally include an Application Programming Interface (API) that provides extensions to enable application developers to extend and/or customize the core functionality thereof through software programs including Common Gateway Interface (CGI) programs, plug-ins, servlets, active server pages (ASP), server side include (SSI) functions or the like.

Configuration rules are rules that describe the operation environment to be enforced on the computers in the computer network. Examples of such configuration rules can include, but are not limited to: (1) checks as to whether the virus definition files are updated for an anti-virus application program; (2) whether the version number of a software application such as Microsoft® Internet Explorer is the same as recommended by the system administrator; (3) whether the 'Auto-save' feature is turned on while starting Microsoft® Word; (4) provide that suitable username/passwords are used by the applications to connect to their servers; (5) that the correct encryption method is used by VPN client programs; and (6) using the correct setting for the host based security products like personal firewall such that without the correct setting, the local personal firewall restricts the network traffic to/from this computer.

The overall method for configuration management and enforcement is now described, according to the preferred embodiment of the current invention.

Agent 108, when invoked, attempts to contact server computer 102 to get the latest configuration rules. Agent 108 stores a copy of the latest configuration rules on client computer 106. After obtaining the configuration rules from configuration rules database 104 via server computer 102, agent 108 starts enforcing the rules on client computer 106 on which it is running. Agent 108 can perform various checks in order to enforce the configuration rules on the software application. For example, agent 108 may check configuration settings of the software application, the registry setting of the software application, the processes that run as part of the software application, etc. Agent 108 also sends log data about the status of client computer 106, any violations of configuration rules, any actions taken by agent 108, the time non-compliance with configuration rules occurs, and so on. Agent 108 periodically contacts server computer 102 to get the most recent configuration rules to enforce on client computer 106.

Agent 108 is said to be running properly after it runs and performs checks to determine whether the configuration rules are being followed by an application on a client computer. Agent 108 can be programmed to run in such a way that if it is not running correctly, the local computer's functionality is either partially or completely disabled. For example, in the case of an anti-virus application, the configuration rule can be defined as—"if virus definitions files are older than 5 Feb. 200X, block (through agent 108 or via another firewall type of application) the network access from that client computer 106 to the network, or disable certain applications like Microsoft® Word, or disable Operating System (OS) operation like file system access, or terminate certain applications' processes". In this case, agent 108 checks the date in the virus-definition file stored in client computer 106, in order to allow or block the anti-virus application.

Agent 108 can enforce the operation of the software application (to be enforced), or the computer environment, so that the enforced software application cannot operate properly unless agent 108 verifies the computer environment according to latest configuration rules. The enforcement of the environment and/or software application can be done in the form of any one or a combination of the following four methods.

First, at the time of installation of agent 108 on client computer 106, agent 108 renames or encrypts the executable file of the enforced software application, so that the software application cannot be invoked, unless agent 108 has verified the software application according to latest configuration rules. As soon as agent 108 verifies the software application, it restores the executable file to its original form. After renaming the original program file, agent 108 can optionally replace it with an informational program to make this "renaming process" more user friendly. The informational program is a dummy program that runs instead of the enforced software application informing the user that he/she needs to invoke agent 108 (or satisfy other conditions defined in the configuration rules) in order to run the requested software application. Whenever agent 108 is not running (or the defined condition is not met), and a user tries to run the software application, the informational program starts running. The informational program then informs the user that in order to run the software application, agent 108 needs to run. Further, the informational program can also optionally ask the user if he/she wants to let the informational program invoke agent 108. If the user agrees to invoking agent 108, the informational program tries invoking agent 108. If agent 108 is run and correctly executed (i.e. verifies the correctness of the software application), the informational program can either invoke the real software application or exit. In the case of exiting of the informational program, agent 108 restores the executable file of the original software application, and runs the original software application. In case agent 108 is not able to run properly, the informational program tells the user to take any necessary measures. In this situation, the user can be asked to contact a system administrator or visit a web site to submit the issue. As soon as agent 108 exits, it renames or encrypts the real program again as needed. For certain Operating Systems where the program cannot be renamed or encrypted while it is running, agent 108 terminates the program, before renaming (or encrypting) it.

Secondly, agent 108 can modify or encrypt the operational environment of the software application to prevent its operation. This can be explained with the help of an example. Consider a software application that cannot run unless the correct settings are known, e.g. a VPN client software's connection configuration file. The settings in this case include the IP address of the enterprise VPN server, the authentication policy, etc. If agent 108 hides this information, the VPN client would not be able to establish the connection. Agent 108 restores the correct settings as soon as it runs. Agent 108 hides the correct settings again as soon as it exits.

Thirdly, the delivery of the correct settings of a software program can be made dependent on agent 108, instead of default settings of the software installation package. Normally, during installation of a software application, the installation package imparts some default settings. The software application may not run if the correct setting for software application's default installation is not there. The third method takes this capability (of imparting default settings) out of the installation package, and gives this responsibility to agent 108. In such case, just installing the software application itself does not achieve the desired outcome. The software application starts to work correctly only when agent 108 delivers the correct setting to the suitable location on client computer 106. An example can be considered to illustrate this method. Consider the case of a VPN client software. In order for a VPN client to connect to the VPN server, the VPN client needs to know the VPN policy. The setting for this is normally stored in a configuration file. By default, the VPN client does not have the correct file; therefore, it cannot connect to the VPN server unless the correct configuration file is delivered to the VPN client. The VPN server is configured not to send the correct file, even if it has the capability of doing so. This gap is then bridged by agent 108. Agent 108, when invoked, gets the correct setting for the VPN client from server computer 102 or a VPN server. After getting the correct settings, the VPN client software is able to function as desired. As soon as agent 108 exits, it removes the correct settings.

Fourthly, the correct settings for allowing connection between the client and server can be changed to prevent such connection without the proper operation of agent 108. For example, for client computer 106 that already has the correct settings to allow it to connect to the VPN server, the system administrator needs to modify the settings on server computer 102 to a degree such that client computer 106 cannot establish the connection unless it gets the new settings by running/invoking agent 108. The settings can be modified by means of changing the IP address of the VPN server, the authentication protocol, the user name, the correct password, the encryption algorithm, etc. When agent 108 is invoked, it can contact server computer 102 to get the correct settings. In this case also, agent 108 can run an informational program telling the user that agent 108 must be run for allowing connection between the client and server.

The above-mentioned methods can be used one at a time or in a combination to achieve the desired enforcement of operational environment on client computer 106. It may be noted that the current invention is not limited to the above four methods. As long as a method can prevent a program/application from correctly achieving its desired functionalities, it falls within the scope of the current invention.

To enforce the operation environment and to ensure that all client computers 106 have agent 108 running on them, another method can be used. All connected client computers 106 in the computer network generate network traffic. It can be programmed that all client computers 106 generate a special traffic pattern at regular time intervals. To derive the existence of agent 108, the traffic from any specified client computer 106 can be analyzed. If client computer 106 does not generate traffic, or generates traffic but does not generate the special traffic pattern, it means there is no agent 108 running on that client computer 106. If the same strategy is to be applied to all client computers 106 in the network, the traffic generated from each client computer 106 needs to be analyzed to identify all client computers 106 which are not running agent 108.

To implement the method discussed above, one needs to collect traffic from all client computers 106 in the computer network. Achieving this in a highly bridged or a switched network becomes a challenging task. A highly bridged and/or switched network means that there are one or more bridges and switches separating the network. In such a network, it is not possible to capture all the traffic of one switch port from another switch port.

In order to collect the traffic of all the networked computers in a highly bridged or switched enterprise network, the invention makes use of one or more agents that can be given responsibility to collect the traffic generated by other agents 108 in their network neighborhood. The collected traffic is submitted to a database. By periodically examining the traffic in the database, the invention can derive the conclusion as to whether agent 108 for a particular client computer 106 is running or not. One of the many possible methods that can reveal the presence of agent 108 running on a particular client computer 106 is described below, with reference to FIG. 2.

Figure 2:
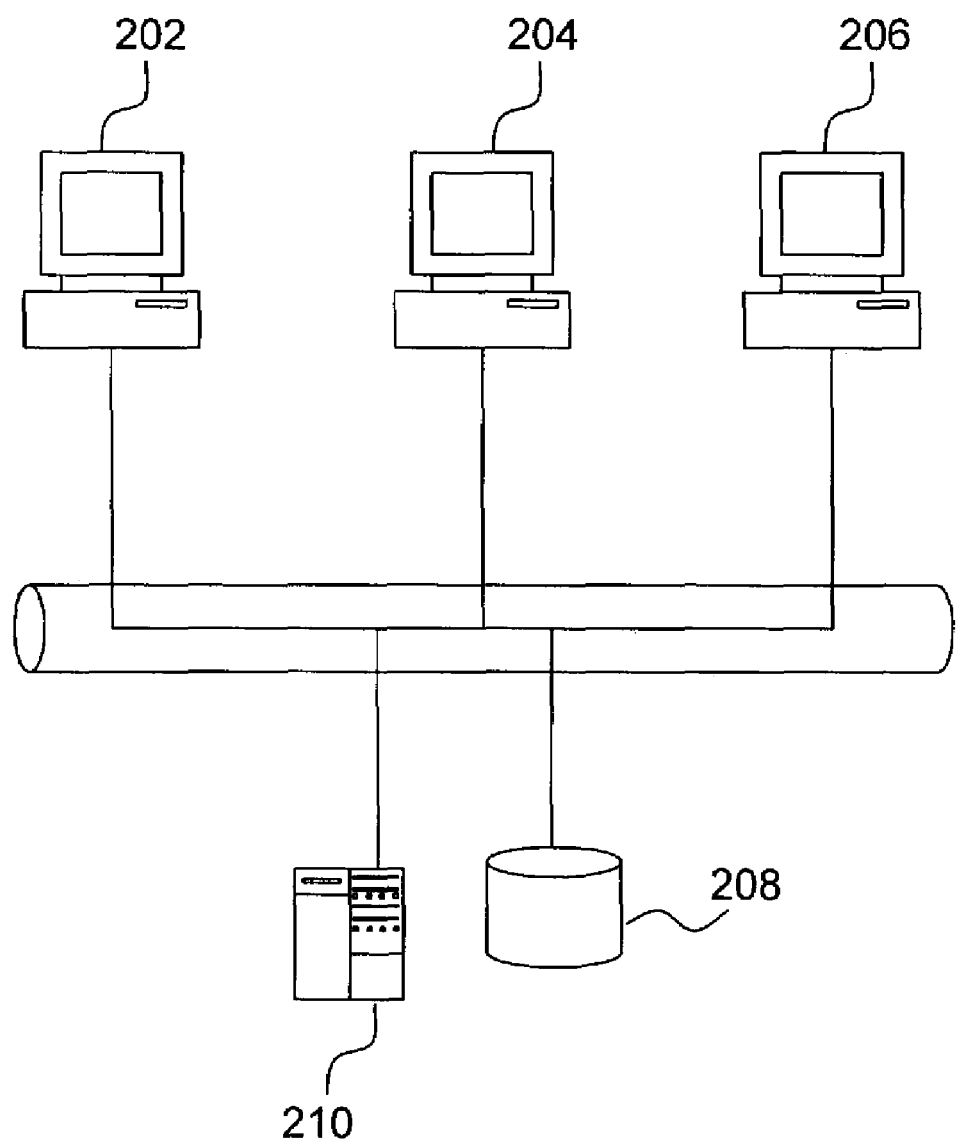
FIG. 2 illustrates an exemplary embodiment of the present invention used for identifying a client computer on which an agent is not running.

One method that can be used to identify client computer 106 on which agent 108 is not running, is now explained with reference to FIG. 2. FIG. 2 shows three client computers 202, 204 and 206 connected to a LAN. Consider the case when client computer 202 and client computer 206 have agent 108 running on them while client computer 204 does not have agent 108 running on it. Agent 108 running on each client computer is programmed to generate a special traffic pattern at a regular time interval. This traffic is collected and sent to a database 208, and can be analyzed later by a server 210. The traffic report in database 208 shows that client computer 202 has a Media Access Control (MAC) address of MAC-1 and Internet Protocol (IP) address of IP-1 and that it receives the traffic from (MAC-1, IP-1), (MAC-2, IP-2) and (MAC-3, IP-3). Similarly, the traffic report in database 208 shows that client computer 206 has a MAC address of MAC-3 and IP address of IP-3 and that it receives the traffic from (MAC-1, IP-1), (MAC-2, IP-2) and (MAC-3, IP-3). Server 210 notices in database 208 that client computer 204 does not report its IP address or the MAC address. This indicates there is no agent 108 running on a client computer 204.

The above example describes a method to make sure agent 108 is running on each client computer 106 in the network.

After agent 108 is running, agent 108 itself can make further checks to ensure the correct operation of the software applications using the methods described above. As already mentioned, the desired way of working of all the software applications should be defined in configuration rules database 104 and agent 108 obtains the desired way from server computer 102 in the form of configuration rules.

In an alternative embodiment of the current invention, a method for enforcing of agent 108 on all client computers 106 is described below. This method prevents client computers 106, not running agent 108, to communicate with client computers 106, running valid agents 108. Agents 108 running on all client computers 106 are configured to generate a special traffic pattern at regular time intervals. If the interval is zero, this means that agent 108 at client computer 106 generates or shapes the normal network traffic to be of a special pattern all the time. For example, agent 108 on a client computer 106 can scramble all the normal network traffic or packets generated from that computer according to some scramble method (such as XORing all the bytes in the packets payload with a fixed byte such as 0xAB). For all client computers 106 with agent 108 running, the network traffic generated from them bears the same scramble pattern. Similarly all the valid network traffic received by client computers 106 is in a scrambled form. This scrambled data is unscrambled by agent 108 at the receiving client computer. The unscrambling of the packets can be done by agent 108 with a different or the same method (like XORing the received packets with the same byte). In this manner, only those client computers are capable of communicating with each other that are running valid agents. If a packet is sent from a client computer that is not running a valid agent 108, then the outgoing packet reaches the receiving client computer in the unscrambled form. Consequently the receiving client computer, running valid agent 108, will not be able to receive the packet correctly (since it will first unscramble the receiving packet).

Figure 3:
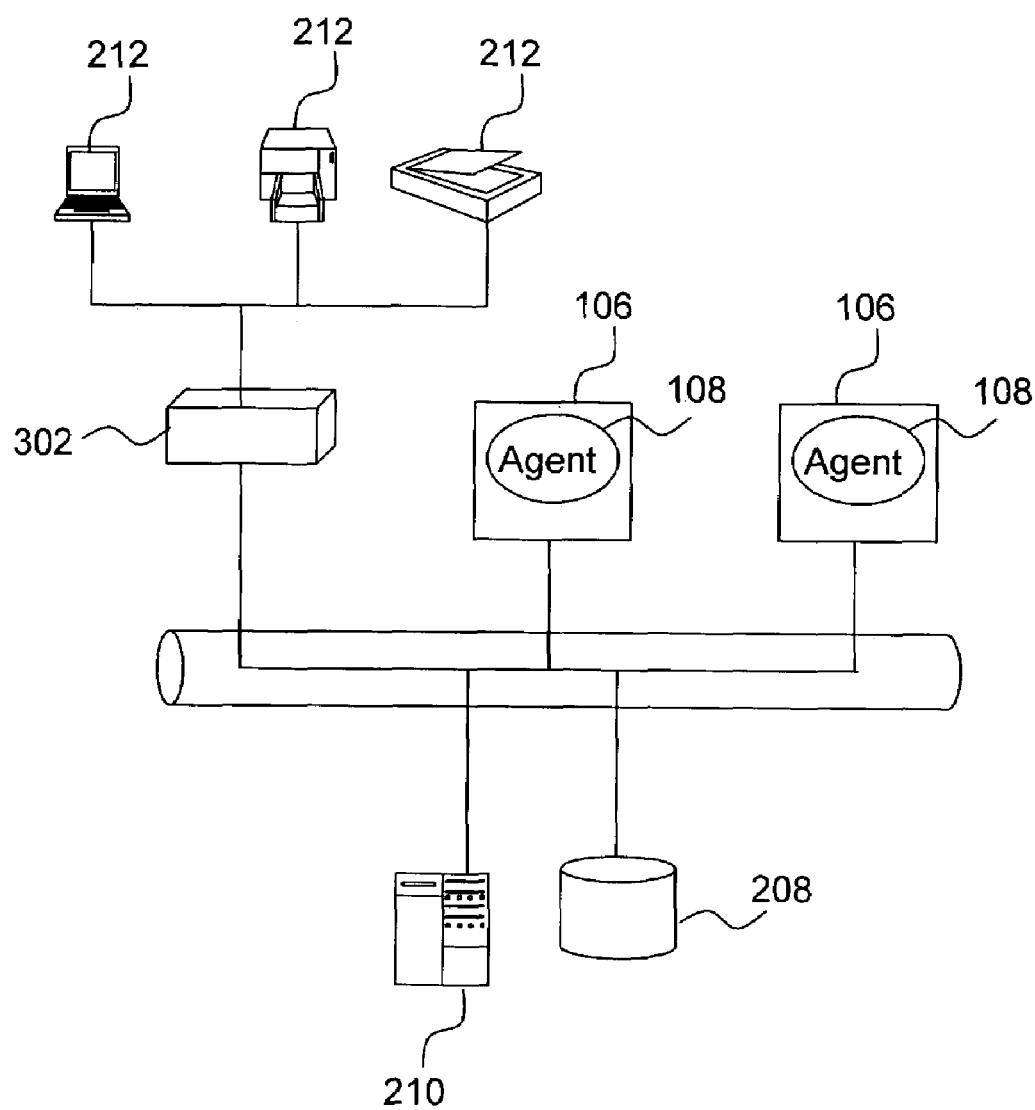
FIG. 3 illustrates another exemplary embodiment of the present invention used for identifying a client computer on which an agent is not running.

Turning now to FIG. 3, it may be noted in the above embodiment that for certain network devices 212 that don't have the required agent 108, like networked printers or PDAs, a special bridge, called an enforcer 302, can be installed that converts the packets from the scrambled state to/from the unscrambled state. As shown in FIG. 3, enforcer 302 can be used to bridge a first portion of the computer network containing the scrambled traffic, and a second portion of the computer network containing the normal traffic (like that of the networked printer). Besides the XOR, any symmetric encryption algorithm like Data Encryption Standard (DES), etc. can also be used for the purpose of scrambling/unscrambling.

Broadly speaking, besides an encryption algorithm, any operation that can change the computer operation environment and restore the environment, can be used in the above embodiment. For example, in the case of IP based networks using Dynamic Host Configuration Protocol (DHCP), a client computer tries to get an IP address from a DHCP server (See http://www.dhcp-handbook.com/dhcp_faq.html for more information about DHCP); the agent software running on the client computer can modify the DHCP request packet such that it contains a special pattern in the packet. On the DHCP server side, it checks the DHCP request packets for this special pattern. The DHCP server replies with the correct IP address if and only if the DHCP request packets have that special pattern.

In an alternative embodiment, the following method can be used to check whether all client computers 106 have agent 108 running on them. Each agent 108 running on each client computer 106 has to contact server computer 102 to check for updates in configuration rules on a periodic basis. In the suggested embodiment, whenever agent 108 contacts server computer 102, server computer 102 can look for the location of client computer 106 from where, the request has come. To enable this, if not already present, the information about location of the particular client computer 106 can be added in the header portion of the packet, which agent 108 sends to server computer 102 while checking for updates in configuration rules. This information could be either IP address or a MAC address or both. Any other address, which can uniquely identify the location of client computer 106, can also be used.

The above embodiment can be explained clearly by means of the situation depicted in FIG. 2. FIG. 2 shows three computers forming a computer network as described earlier. Consider the case when client computer 202 and client computer 206 have agent 108 running on them while client computer 204 does not have agent 108 running on it. Agent 108, running on each client computer, checks for updates in configuration rules with server computer 210. When agent 108 running on client computer 202 contacts server computer 210, server computer 210 looks at the information present in header of the packet received from agent 108 and identifies the IP address and MAC address of client computer 202 concluding that agent 108 is running on client computer 202. Similarly when agent 108 running on client computer 206 contacts server computer 102, server computer 102 looks at the information present in header of the packet received from agent 108 and identifies IP address and MAC address of client computer 206 concluding that agent 108 is running on client computer 206. But since there is no agent 108 running on client computer 204, server computer 102 does not get to identify any computer in the network which can have IP address and MAC address corresponding to client computer 204. With this information, server computer 102 can find out that client computer 204 is not running agent 108, while the other computers are doing so. Server computer 102 can then take necessary measures to ensure that agent 108 runs on client computer 204 also.

In an embodiment, when a non-compliant computer (on which agent 108 is not running) is detected, the gateway such as the corporate firewall or VPN can be made to block the traffic from the non-compliant computer to communicate with other computers in the network. For example, a Transmission Control Protocol (TCP) Reset packet can be sent to the non-compliant computer to prevent it from using TCP protocol or a fake Address Resolution Protocol (ARP) packet can be sent to prevent it from using any IP protocol.

As described above, it is the task of the agents in the client computers to get the latest version of the configuration-rules file from server 102. In another embodiment of the current invention, server 102 can also make periodic checks to make sure that the agents in the network have the updated copy of the configuration rules. One possible way this can be done is as follows. Server 102 may demand a hashed value of the configuration rules file, stored at the client computers. Server 102 can then compare these hashed values with the hashed value of latest access rules file, to determine which client computers are having older versions of configurations rules file. Server 102 may then proceed to update the values on the respective client computers.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for enforcing the operation environment of a client computer in a computer network, the client computer running one or more software applications, the software applications running in compliance with the enforced operation environment, the operation environment being enforced using a set of configuration rules, the system comprising:
   a. a configuration rule database for storing the configuration rules;
   b. one or more server computers connected through the computer network, the server computer interacting with the configuration rules database for updating the client computers with latest configuration rules; and
   c. an agent that resides and runs on the client computer, the agent enforcing the operation environment of the software application on the client computer using the configuration rules, wherein the agent comprises means for modifying the operation environment so as to prevent use of the software application when the agent is not running on the client computer, the system further comprising means for identifying which client computers in the computer network are not running the agent comprising:
   means for analyzing the traffic generated from each client computer for a special traffic pattern generated at regular time intervals, wherein if a client computer does not generate the special traffic pattern, the agent is not running on the client computer.

2. The system as recited in claim 1 wherein the agent further comprises:
   a. means for contacting the server to get a copy of the configuration rules;
   b. means for verifying whether configuration rules are being followed by the software application; and
   c. means for blocking the software application, in case the software application does not follow the configuration rules.

3. The system as recited in claim 1 wherein the system further comprises means for blocking the client computers in the computer network that are not running the agent.

4. The system as recited in claim 1 wherein the software application comprises an anti-virus application program, wherein the configuration rules specify that upon a determination that virus definition files of the anti-virus application program are outdated, functionality of the client computer is at least partially disabled.

5. A method for enforcing the operation environment of a client computer in a computer network by means of an agent residing and running on the client computer, the client computer running one or more software applications, the software applications running in compliance with the enforced operation environment, the operation environment being enforced using a set of configuration rules, the method comprising the steps of:
   a. the agent modifying the operation environment of the software application, so that the software application cannot be run without the agent being run, wherein the software application comprises an anti-virus application program;
   b. the agent periodically contacting a server computer to get a copy of the latest configuration rules, wherein the configuration rules specify that upon a determination that virus definition files of the anti-virus application program are outdated, functionality of the client computer is at least partially disabled;
   c. the agent verifying the software application according to the configuration rules;

d. the agent blocking the software application, in case the software application does not follow the configuration rules; and
e. the agent granting access to the software application, in case the software application follows the configuration rules, the method further comprising the step of ensuring that the agent is running as desired on all the client computers in the computer network comprising:
a. all agents in the computer network, sending a special traffic pattern to a database, at regular intervals of time;
b. the server analyzing the traffic pattern data stored in the database;
c. the server identifying the client computers that are not running the agent, the identification being done based on the analysis of the traffic pattern data; and
d. the server taking corrective measures on the client computers that are not running the agent.

6. The method as recited in claim 5 further comprising the step of sending a log to the server about the status of various transactions in the client computer involving the agent and the software application.

7. The method as recited in claim 5 wherein the method further comprises the step of blocking the client computers in the computer network that are not running the agent.

8. The method as recited in claim 5 wherein the step of modifying the operation environment comprises the step of renaming or encrypting an executable file of the application program.

9. The method as recited in claim 5 wherein the step of modifying the operation environment comprises the step of modifying or encrypting the correct settings of the software application.

10. The method as recited in claim 5 wherein the step of modifying the operation environment comprises the step of making the delivery of correct settings of the software application dependent on the agent.

11. The method as recited in claim 5 wherein the step of modifying the operation environment comprises the step of changing the correct settings for allowing connection between the client computer and the server computer.

12. The method as recited in claim 5 wherein the step of ensuring that the agent is running on all client computers further comprises the steps of:
a. the server keeping track of the client computers that contact the servers for updates;
b. the server identifying the client computers that do not contact the server for updating the configuration rules; and
c. the server taking corrective measures against the client computers not contacting the server for updating the client computers.

13. A method for enforcing the operation environment of a client computer in a computer network by means of an agent residing and running on the client computer, the client computer running one or more software applications, the software applications running in compliance with the enforced operation environment, the operation environment being enforced using a set of configuration rules, the method comprising the steps of:
a. the agent modifying the operation environment of the software application, so that the software application cannot be run without the agent being run, wherein the software application comprises an anti-virus application program;
b. the agent periodically contacting a server computer to get a copy of the latest configuration rules, wherein the configuration rules specify that upon a determination that virus definition files of the anti-virus application program are outdated, functionality of the client computer is at least partially disabled;
c. the agent verifying the software application according to the configuration rules;
d. the agent blocking the software application, in case the software application does not follow the configuration rules; and
e. the agent granting access to the software application, in case the software application follows the configuration rules, the method further comprising the step of ensuring that an agent is running as desired on all client computers in a computer network comprising the steps of:
a. all agents in the computer network scrambling the outgoing data; and
b. all agents in the computer network unscrambling the incoming data.

14. A system comprising a client computer and a software agent product for enforcing operation environment of the client computer in a computer network, the client computer running one or more software applications, the software applications running in compliance with the enforced operation environment, the operation environment being enforced using a set of configuration rules, the software agent product comprising:
a. first instruction means for modifying the operation environment of the software application, so that the software application cannot be run without an agent residing on and being run on the client computer, wherein the software application comprises an anti-virus application program;
b. second instruction means for periodically contacting a server computer by the agent to get a copy of the latest configuration rules, wherein the configuration rules specify that upon a determination that virus definition files of the anti-virus application program are outdated, functionality of the client computer is at least partially disabled;
c. third instruction means for verifying the software application according to the configuration rules;
d. fourth instruction means for blocking the software application, in case the software application does not follow the configuration rules; and
e. fifth instruction means for granting access to the software application, in case the software application follows the configuration rules, the software agent product further comprising instruction means for identifying which client computers in the computer network are not running the agent comprising:
instruction means for analyzing the traffic generated from each client computer for a special traffic pattern generated at regular time intervals, wherein if a client computer does not generate the special traffic pattern, the agent is not running on the client computer.

15. A system comprising a client computer and a software agent product for enforcing operation environment of the client computer in a computer network, the client computer running one or more software applications, the software applications running in compliance with the enforced operation environment, the operation environment being enforced using a set of configuration rules, the software agent product comprising:
a. first instruction means for modifying the operation environment of the software application, so that the software application cannot be run without an agent residing on and being run on the client computer, wherein the software application comprises an anti-virus application program;
b. second instruction means for periodically contacting a server computer by the agent to get a copy of the latest configuration rules, wherein the configuration rules specify that upon a determination that virus definition files of the anti-virus application program are outdated, functionality of the client computer is at least partially disabled;
c. third instruction means for verifying the software application according to the configuration rules;
d. fourth instruction means for blocking the software application, in case the software application does not follow the configuration rules; and
e. fifth instruction means for granting access to the software application, in case the software application follows the configuration rules,
wherein all agents in the computer network scramble the outgoing data; and
wherein all agents in the computer network unscramble the incoming data.

\* \* \* \* \*